US011472478B2

(12) United States Patent
Shibata et al.

(10) Patent No.: US 11,472,478 B2
(45) Date of Patent: *Oct. 18, 2022

(54) STEERING SYSTEM HAVING DIFFERENT OPERATION MODES

(71) Applicant: Toyota Jidosha Kabushiki Kaisha, Toyota (JP)

(72) Inventors: Kenji Shibata, Nagoya (JP); Takahiro Okano, Chiryu (JP); Takenari Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

This patent is subject to a terminal disclaimer.

(21) Appl. No.: 16/388,991

(22) Filed: Apr. 19, 2019

(65) Prior Publication Data

US 2019/0322314 A1 Oct. 24, 2019

(30) Foreign Application Priority Data

Apr. 23, 2018 (JP) .............................. JP2018-082555

(51) Int. Cl.
*B62D 6/08* (2006.01)
*B60W 10/20* (2006.01)
*B62D 5/00* (2006.01)

(52) U.S. Cl.
CPC ............... *B62D 6/08* (2013.01); *B60W 10/20* (2013.01); *B62D 5/003* (2013.01)

(58) Field of Classification Search
CPC .......... B62D 6/08; B62D 5/003; B60W 10/20
See application file for complete search history.

(56) References Cited

U.S. PATENT DOCUMENTS

2007/0165910 A1* 7/2007 Nagaoka ................ G06V 20/58
382/104
2014/0172236 A1 6/2014 Nishikawa et al.
(Continued)

FOREIGN PATENT DOCUMENTS

CN 105711640 A 6/2016
JP 2009-056820 A 3/2009
(Continued)

OTHER PUBLICATIONS

Office Action of U.S. Appl. No. 16/388,358 (dated Mar. 24, 2021).
(Continued)

*Primary Examiner* — Rachid Bendidi
(74) *Attorney, Agent, or Firm* — Dinsmore & Shohl LLP

(57) ABSTRACT

A steering system of a vehicle, including an operation member to be operated by a driver, a steering device configured to steer a wheel, and a controller configured to control the steering system, wherein the controller is configured to parallelly execute a main process including a process in which the controller controls the steering device to perform steering of the wheel in accordance with an operation of the operation member and an auxiliary process relating to an operation of the steering system and configured to decrease an execution ratio of the main process and increase an execution ratio of the auxiliary process when a condition that a running speed of the vehicle is not lower than a threshold speed is satisfied.

13 Claims, 4 Drawing Sheets

(56) References Cited

U.S. PATENT DOCUMENTS

| | | | |
|---|---|---|---|
| 2016/0121906 A1* | 5/2016 | Matsuno | G05D 1/0088 |
| | | | 701/23 |
| 2016/0176440 A1 | 6/2016 | Witte et al. | |
| 2018/0208235 A1 | 7/2018 | Miyashita | |
| 2018/0316895 A1* | 11/2018 | McClelland | G07C 5/02 |
| 2019/0009794 A1* | 1/2019 | Toyoda | B60W 40/09 |
| 2019/0284921 A1 | 9/2019 | Xue et al. | |
| 2019/0322312 A1 | 10/2019 | Okano et al. | |

FOREIGN PATENT DOCUMENTS

| | | |
|---|---|---|
| JP | 2010036806 A | 2/2010 |
| JP | 2013028312 A | 2/2013 |
| WO | 2017/022006 A1 | 2/2017 |

OTHER PUBLICATIONS

Final Office Action of U.S. Appl. No. 16/388,358 (dated Sep. 28, 2021).

Advisory Action of U.S. Appl. No. 16/388,358 (dated Jan. 13, 2022).

Office Action of U.S. Appl. No. 16/388,358 (dated Mar. 16, 2022).

Notice of Allowance dated Aug. 2, 2022 to U.S. Appl. No. 16/388,358, filed Apr. 18, 2019.

\* cited by examiner

FIG.3A  «FIRST MODE»
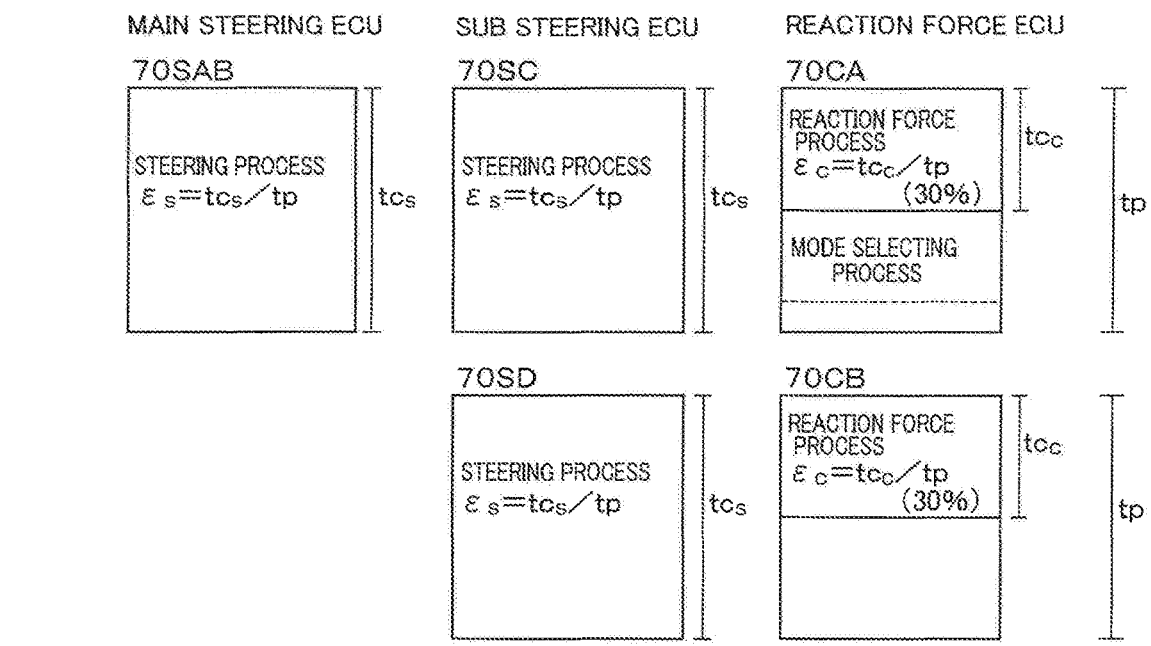
FIG.3B  «SECOND MODE»
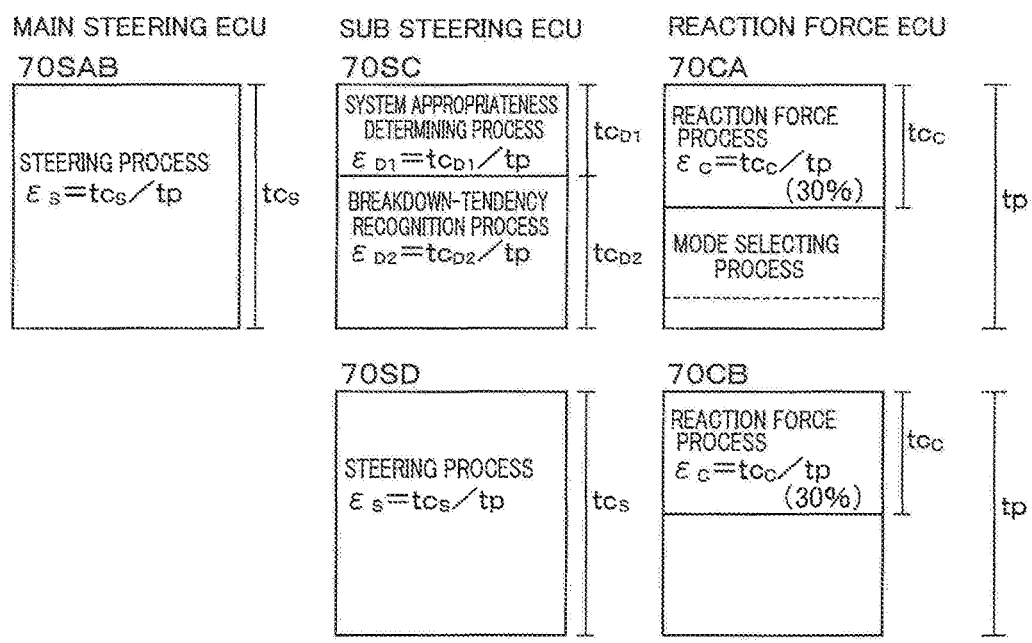

STEERING SYSTEM HAVING DIFFERENT OPERATION MODES

CROSS REFERENCE TO RELATED APPLICATION

The present application claims priority from Japanese Patent Application No. 2018-082555, which was filed on Apr. 23, 2018, the disclosure of which is herein incorporated by reference in its entirety.

BACKGROUND

Technical Field

The following disclosure relates to a steering system in which steering of a wheel in accordance with an operation of an operation member by a driver is achieved by a steering device.

Description of Related Art

A steering system described in Japanese Patent Application Publication No. 2010-36806, for instance, is proposed in the field of vehicle steering systems. A controller in the steering system is configured to execute two processes, i.e., a process of controlling a steering torque (which is one sort of a main process) and a failure diagnosis process of diagnosing a failure of the controller (which is one sort of an auxiliary process). In the steering system, the controller executes the failure diagnosis process on a higher priority basis than the process of controlling the steering torque.

SUMMARY

A steering system in which steering of a wheel in accordance with an operation of the operation member is performed by a steering device under control of the controller, namely, what is called steer-by-wire steering system, has been actively developed in recent years. The controller in such a steering system suffers from a relatively heavy load in a process in which the controller controls the steering device to perform the steering of the wheel in accordance with the operation of the operation member. (The process will be hereinafter referred to as "steering process" where appropriate). Thus, in the case where the controller executes both of the main process including the steering process and the auxiliary process relating to an operation of the steering system, the problem of the load on the controller is serious. The problem is not solved by the conventional technique of executing the auxiliary process on a higher priority basis described in the above Publication. An attempt to solve the problem by use of a high-performance controller inevitably pushes up a cost of the steering system, so that the steering system equipped with such a controller does not have high utility. Accordingly, the present disclosure is directed to a steer-by-wire steering system having high utility.

In one aspect of the disclosure, a steering system includes a controller configured to parallelly execute a main process including a process in which the controller controls a steering device to perform steering of the wheel in accordance with an operation of an operation member and an auxiliary process relating to an operation of the steering system and configured to decrease an execution ratio of the main process and increase an execution ratio of the auxiliary process when a condition that a running speed of a vehicle is not lower than a threshold speed is satisfied.

When the running speed of the vehicle becomes higher, a force by which the wheel is steered need not be so large. Accordingly, even if the execution ratio of the main process is decreased when the running speed of the vehicle is high, any particularly serious problem does not arise. By decreasing the execution ratio of the main process, the execution ratio of the auxiliary process can be increased by an amount corresponding to the decrease in the execution ratio of the main process, thus enabling the auxiliary process to be thorough and sufficient one. According to the steering system of the present disclosure, by changing the execution ratios of the main process and the auxiliary process in the controller, a high-performance steering system can be constructed while preventing a processing load of the controller from becoming excessive.

There will be exemplified and explained various forms of the present disclosure. Each of the forms is numbered and depends from the other form or forms, where appropriate. This is for easier understanding of the forms of the present disclosure, and it is to be understood that combinations of constituent elements that constitute the present disclosure are not limited to those described in the following forms. That is, it is to be understood that the present disclosure shall be construed in the light of the following description of various forms and embodiments. It is to be further understood that, as long as the present disclosure is construed in this way, any form in which one or more constituent elements is/are added to or deleted from any one of the following forms may be considered as one form of the present disclosure.

(1) A steering system of a vehicle, comprising an operation member to be operated by a driver, a steering device configured to steer a wheel, and a controller configured to control the steering system, wherein the controller is configured to parallelly execute a main process including a process in which the controller controls the steering device to perform steering of the wheel in accordance with an operation of the operation member and an auxiliary process relating to an operation of the steering system and configured to decrease an execution ratio of the main process and increase an execution ratio of the auxiliary process when a condition that a running speed of the vehicle is not lower than a threshold speed is satisfied.

The "controller" in this form is an ordinary device whose main constituent element is a computer including a processor, a RAM, a ROM, and so on. Here, an amount of all processes executed by the controller per unit time is defined as an overall processing amount. In this case, the "execution ratio of the main process" and the "execution ratio of the auxiliary process" in the controller are respectively regarded as a ratio of a processing amount of the main process to the overall processing amount and a ratio of a processing amount of the auxiliary process to the overall processing amount. The execution ratio may be referred to as a processing load, a processing burden or the like of the controller in each of the main process and the auxiliary process. As later explained, the processing load of the controller is prevented from becoming excessive by changing the execution ratio of the main process and the execution ratio of the auxiliary process depending on circumstances. In the case where the main process should be executed on a higher priority basis than the auxiliary process, the execution ratio of the main process is increased. On the other hand, in the case where a large amount of processes are not required for the main process, the execution ratio of the main process may be decreased. In this case, by increasing the execution ratio of the auxiliary process by an amount corresponding to the decrease in the execution ratio of the main process, it is possible to execute a sufficient and thorough auxiliary process.

In this form, it is assumed that the load imposed on the controller by execution of the main process when the vehicle is running at a relatively high speed is light, and a thorough and sufficient auxiliary process is executed in high-speed running of the vehicle. This form enables construction of a high-performance steering system while preventing the processing load of the controller from becoming too large. When the running speed of the vehicle is relatively high, the steering of the wheel by the steering device can be performed with a comparatively small force, so that the load that acts on the steering device is comparatively light. This form may be regarded as a form in which the load of the controller by execution of the main process is lightened and the auxiliary process is thoroughly and sufficiently executed when the vehicle running speed is relatively high.

In general, there is an upper limit in the overall processing amount of the controller as a whole. From the viewpoint of making the most of the overall processing amount, the controller is desirably execute, all the times, the processes such that the overall processing amount is close to the upper limit. In the case where the controller executes the processes to such an extent that the overall processing amount is close to the upper limit, an increase in the execution ratio of the main process results in a decrease in the execution ratio of the auxiliary process, and an increase in the execution ratio of the auxiliary process results in a decrease in the execution ratio of the main process. In the case where the execution ratio of the main process and the execution ratio of the auxiliary process are changed, a time period for which each process is executed may be changed by changing details of each process or the number of executions of each process per unit time may be changed without changing details of each process.

In the case where the controller includes a plurality of control units each including a computer, each of the plurality of control units may change the execution ratio of the main process and the execution ratio of the auxiliary process. Alternatively, only at least one control unit, as a part of the plurality of control units, may change the execution ratio of the main process and the execution ratio of the auxiliary process. In either configuration, the execution ratio of the main process and the execution ratio of the auxiliary process in the controller as a whole are changed. Further, the execution ratio of the main process or the execution ratio of the auxiliary process may be 0 irrespective of whether the execution ratios are those in the controller as a whole or the execution ratios are those in each control unit. That is, the execution ratio of the main process and the execution ratio of the auxiliary process may be changed such that one of the main process and the auxiliary process is not to be executed in the controller as a whole or in each control unit.

The "process in which the controller controls the steering device to perform steering of the wheel in accordance with the operation of the operation member" included in the main process is a basic process in the steer-by-wire steering system. (This process will be hereinafter referred to as "steering process" where appropriate.) For instance, the process is a control process for controlling the steering device such that a steering angle of the wheel becomes equal to an angle that corresponds to an operating angle of a steering wheel as the operation member. The steer-by-wire steering system is often equipped with a reaction force actuator configured to give an operation reaction force to the operation member for making a steering feeling felt by a driver appropriate one. The main process may include, in addition to the steering process, a process for controlling an operation reaction force generated by the reaction force actuator and other processes in association with the steering process. (The process for controlling the operation reaction force will be hereinafter referred to as "reaction force process" where appropriate.)

The auxiliary process relating to the operation of the steering system is not directly relevant to the operation of the steering system, and the sort of the auxiliary process is not limited. For instance, the auxiliary process includes a process of confirming soundness of the steering system. Specifically, the auxiliary process includes a breakdown-tendency recognition process of recognizing that the steering system has a tendency to break down, a system appropriateness determining process of determining whether or not the steering system is in a state in which the steering of the wheel can be appropriately performed, and so on, as later explained.

(2) The steering system according to the form (1), wherein the auxiliary process includes a breakdown-tendency recognition process of recognizing that the system has a tendency to break down.

This form includes features as to the sort of the auxiliary process. The "breakdown-tendency recognition process" may include an urgent process for detecting that an electric failure or the like is occurring in the steering system right now. In the case where the steering system is configured to change the execution ratio of the auxiliary process, the breakdown-tendency recognition process may include, as a principal process, a process of recognizing that the steering system will probably break down after a lapse of a certain time if the steering system keeps operating. For instance, as the breakdown-tendency recognition process, there may be employed a process of recognizing a condition of the steering system that is not so serious and urgent, such as a condition of fatigue of constituent components of the steering device, the reaction force actuator and the like. In a steer-by-wire steering system in which the wheel is steered by a force of a drive source of the steering device without depending on the operation force applied to the operation member by the driver, it is particularly meaningful to recognize the tendency of the breakdown of the steering device.

(3) The steering system according to the form (1) or (2), wherein the auxiliary process includes a system appropriateness determining process of determining whether or not the steering system is in a state in which the steering of the wheel is appropriately performed.

There may be cases in which the steering of the wheel in accordance with the operation of the operation member is not performed due to some reason though the system is not broken down. For instance, a case is expected in which the operation amount of the operation member and the steering amount of the wheel differ from each other beyond a certain degree. Further, in an arrangement in which a plurality of sensors having the same function are provided as a redundant system, a case is expected in which detection values of the sensors differ from one another beyond a certain degree. In this form, a process of confirming the presence or absence of such cases is executed as the auxiliary process. In this respect, such cases may be regarded as cases that occur when the steering system is already suffering from the breakdown. Thus, the system appropriateness determining process may be regarded as one sort of a system breakdown determining process.

(4) The steering system according to any one of the forms (1) through (3),
wherein the steering device is configured to be operated by a drive current supplied thereto, and
wherein the controller is configured to decrease the execution ratio of the main process and increase the execution ratio of the auxiliary process when both of the condition that the running speed of the vehicle is not lower than the threshold speed and a condition that the drive current is not larger than a threshold current are satisfied.

When the drive current is large, the load that acts on the steering device is large. On the other hand, when the drive current is small, the load that acts on the steering device is small. This form takes it into account. Accordingly, this form allows the auxiliary process to be thorough and sufficient with higher reliability when the load of the steering device is small.

(5) The steering system according to any one of the forms (1) through (4),
wherein the controller is configured to be operable in a first mode and operable in a second mode in which the execution ratio of the main process is set to be lower than that in the first mode and the execution ratio of the auxiliary process is set to be higher than that in the first mode, and
wherein the controller is configured to switch an operation mode thereof from the first mode to the second mode so as to decrease the execution ratio of the main process and increase the execution process of the auxiliary process.

Although the execution ratio of the main process and the execution ratio of the auxiliary process may be continuously changed, the execution ratios may be set to respective specific values. As recited in this form, two mutually different set execution ratios may be determined for each of the main process and the auxiliary process. Further, as the operation mode of the controller, the first mode may be set such that the execution ratio of the main process is equal to a higher one of the two set execution ratios while the execution ratio of the auxiliary process is equal to a lower one of the two set execution ratios, and the second mode may be set such that the execution ratio of the main process is equal to a lower one of the two set execution ratios while the execution ratio of the auxiliary process is equal to a higher one of the two set execution ratios. By switching the operation mode of the controller between the thus set first and second modes, the execution ratios of the main process and the auxiliary process can be simply changed depending on circumstances.

(6) The steering system according to any one of the forms (1) through (5),
wherein the steering device includes a plurality of drive sources, and the controller includes a plurality of control units each of which is configured to control at least one of the plurality of control units, and
wherein the steering device is configured to steer the wheel by a drive force of at least one of the plurality of drive sources controlled by any of the plurality of control units.

(7) The steering system according to the form (6), wherein at least one of the plurality of control units is at least one both process execution unit configured to selectively execute one of the main process and the auxiliary process, and at least one of the at least one both process execution unit is configured to execute the auxiliary process in place of the main process, so that the controller decreases the execution ratio of the main process and increases the execution ratio of the auxiliary process.

According to the above two forms, the wheel is steered by the drive force of at least one of the plurality of drive sources controlled by any of the control units that are executing the main process. It is thus possible to change the execution ratio of the main process by changing the number of control units that execute the main process. According to the latter form, the at least one both process execution unit is configured to execute a selected one of the main process and the auxiliary process. It is thus possible to easily change the execution ratio of the main process and the execution ratio of the auxiliary process because a selected one of the main process and the auxiliary process is executed by the at least one both process execution unit. The number of both process execution units is not limited. For instance, only one of the control units may be the both process execution unit. Alternatively, two or more control units may be the both process execution units. In the case where two or more control units are the both process execution units, all of the two or more both process execution units may be configured to execute a selected one of the main process and the auxiliary process or only a part of the two or more both process execution units may be configured to execute a selected one of the main process and the auxiliary process.

(8) The steering system according to the form (7),
wherein the controller includes, as the at least one both process execution unit, at least two both process execution units, and
wherein the at least two both process execution units alternately execute the auxiliary process in place of the main process.

This form enables the at least two both process execution units to evenly execute the auxiliary process. Further, in the event of a failure of any one of the both process execution units, it is possible to permit other both process execution unit to execute the auxiliary process.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 3A is a chart for explaining the process executed by the controller of the steering system in FIG. 1 in a first mode;

FIG. 3B is a chart for explaining the process executed by the controller of the steering system in FIG. 1 in a second mode.

DETAILED DESCRIPTION OF THE EMBODIMENT

Figure 1:
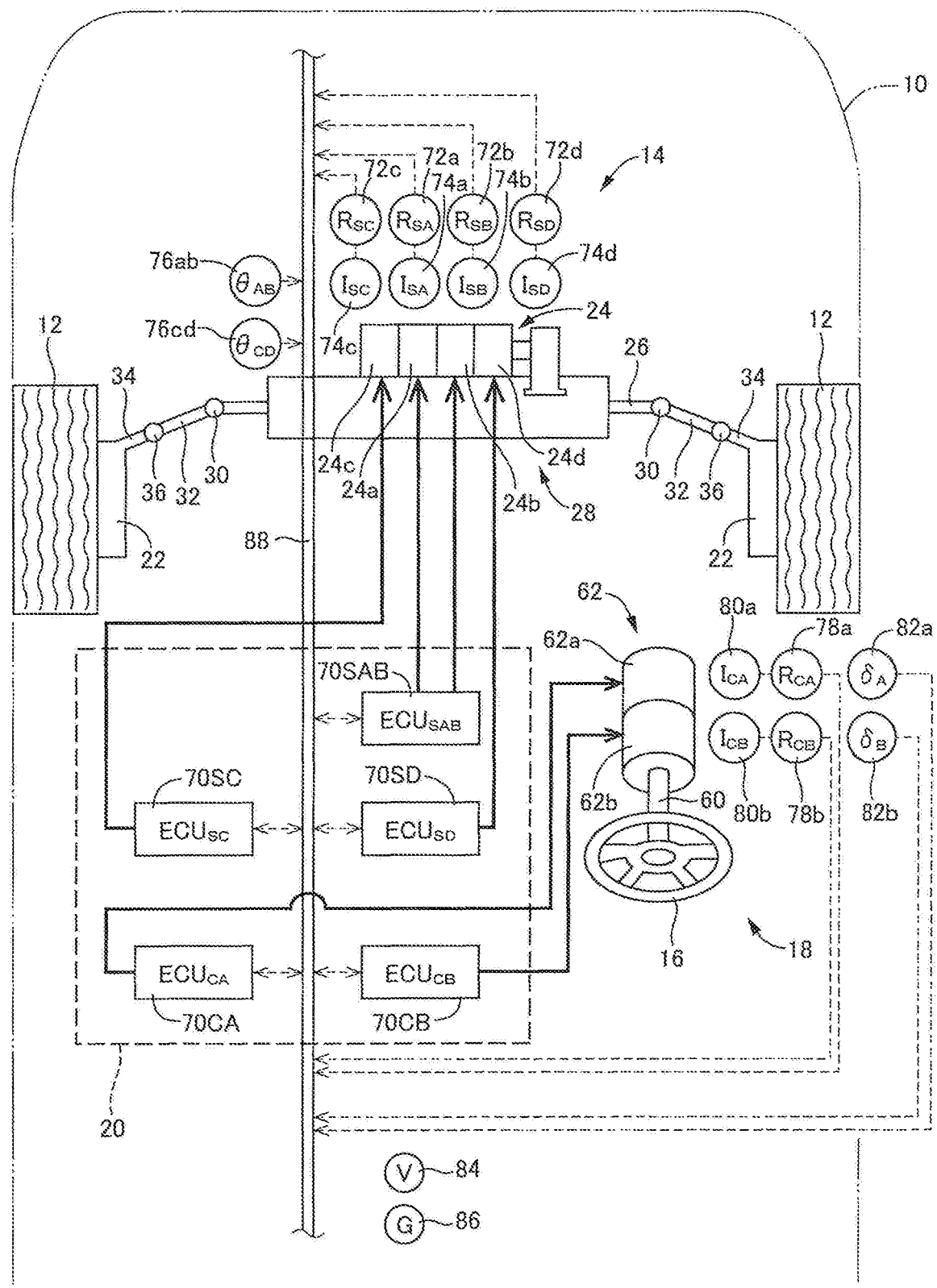
FIG. 1 is a schematic view illustrating an overall structure of a steering system according to one embodiment.

Referring to the drawings, there will be explained below in detail a steering system according to one embodiment of the present disclosure. It is to be understood that the present disclosure is not limited to the details of the following embodiment but may be embodied based on the forms described and may be changed and modified based on the knowledge of those skilled in the art.

[A] Structure of Steering System i) Overall Structure

As schematically illustrated in FIG. 1, a steering system according to one embodiment is configured to steer front right and left wheels 12 of a vehicle 10. The steering system includes a steering device 14 configured to steer the wheels 12, an operation device 18 including a steering wheel 16, as an operation member, to be operated by a driver, and a controller 20 configured to control the steering device 14 to perform steering of the wheels 12 in accordance with an operation of the steering wheel 16.

Each wheel 12 is rotatably held by a corresponding steering knuckle 22 that is pivotably supported by a vehicle body via a corresponding suspension apparatus. The steering device 14 includes: a steering actuator 28 including an electric motor 24 as a drive source and configured to move a steering rod 26 in a right-left direction; and link rods 32, one end of each of which is coupled to a corresponding one of opposite ends of the steering rod 26 via a ball joint 30. The other end of each link rod 32 is coupled, via a ball joint 36, to a knuckle arm 34 of the corresponding steering knuckle 22. The steering knuckles 22 are pivoted by a rightward and leftward movement of the steering rod 26, whereby the wheels 12 are steered.

ii) Structure of Steering Device

Figure 2:
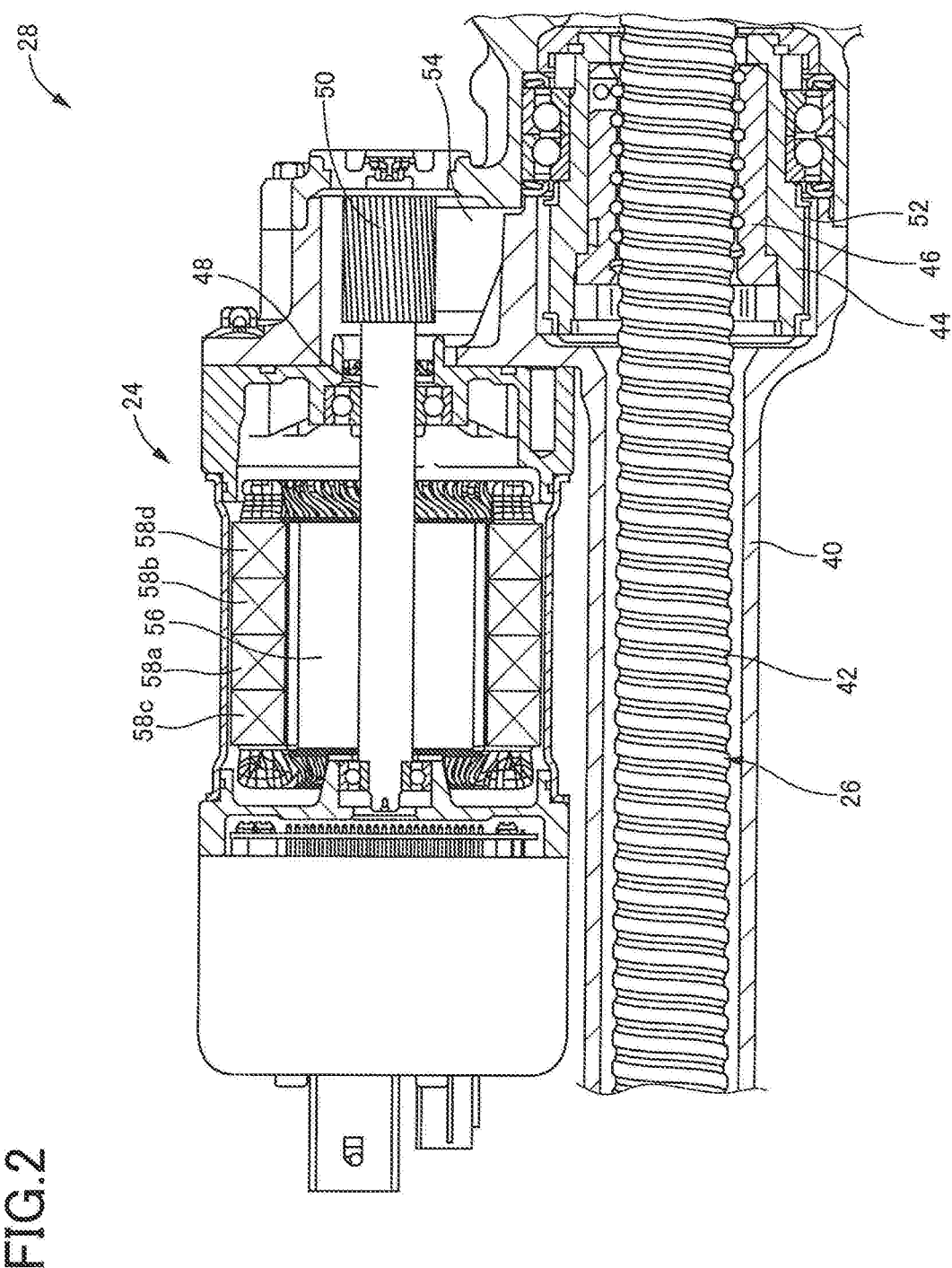
FIG. 2 is a cross-sectional view of a steering actuator of a steering device in the steering system illustrated in FIG. 1.

Referring also to FIG. 2, the steering actuator 28 of the steering device 14 will be explained. As shown in FIG. 2, the steering actuator 28 holds, in its housing 40, the steering rod 26 such that the steering rod 26 is unrotatable about an axis thereof and such that the steering rod 26 is movable in the right-left direction. A threaded groove 42 is formed on an outer circumference of the steering rod 26. A holding sleeve 44 is held in the housing 40 so as to be rotatable about an axis thereof and so as to be immovable in the right-left direction. A nut 46 holding bearing balls is fixedly held by the holding sleeve 44. The nut 46 and the steering rod 26 are threadedly engaged with each other and constitute a ball screw mechanism. The electric motor 24 is disposed outside the housing 40 such that its axis is parallel to an axis of the steering rod 26. (The electric motor 24 will be hereinafter referred to as "steering motor 24" where appropriate to distinguish from other electric motor.) A timing pulley 50 is attached to a distal end of a motor shaft 48 of the steering motor 24. Like the timing pulley 50, the holding sleeve 44 includes engaging teeth 52 formed on its outer circumference. Thus, the holding sleeve 44 functions as another timing pulley that is paired with the timing pulley 50. A timing belt 54 is wound around the holding sleeve 44 and the timing pulley 50. Rotation of the steering motor 24, strictly, rotation of the motor shaft 48, causes the nut 46 to rotate, so that the steering rod 26 is moved rightward or leftward in accordance with the rotational direction of the steering motor 24.

The steering motor 24 is a three-phase, brushless DC motor and includes four systems. Specifically, magnets 56 common to the four systems are fixed to an outer circumference of the motor shaft 48 so as to be arranged in the circumferential direction, and four coil sets corresponding to the respective four systems, i.e., a set of coils 58a, a set of coils 58b, a set of coils 58c, and a set of coils 58d, are disposed so as to be opposed to the magnets 56. The steering motor 24 is rotated by supplying electric current to one of, at least two of, or all of the four sets of coils 58a, 58b, 58c, 58d. A torque generated by the steering motor 24, namely, a force that moves the steering rod 26 in the right-left direction, is generally proportional to a sum of the electric currents supplied to the coils 58a, 58b, 58c, 58d. Because the steering motor 24 is a four-system motor, the steering actuator 28 may be assumed to have four electric motors. In this case, as shown in FIG. 1, portions of the steering motor 24 corresponding to the respective four systems will be hereinafter referred to as a steering motor 24a, a steering motor 24b, a steering motor 24c, and a steering motor 24d for convenience sake. Accordingly, the steering motors 24a, 24b, 24c, 24d are regarded as four drive sources of the steering device 14.

iii) Structure of Operation Device

As shown in FIG. 1, the operation device 18 includes the steering wheel 16, a steering shaft 60 fixed to the steering wheel 16 and rotatable together with the steering wheel 16, and an electric motor 62. A motor shaft of the electric motor 62 is integral with the steering shaft 60, and the electric motor 62 applies or imparts a rotational torque to the steering wheel 16. The rotational torque functions as a reaction force (operation reaction force) with respect to an operation of the steering wheel 16 by the driver, i.e., a steering operation. Accordingly, the electric motor 62 will be hereinafter referred to as "reaction force motor 62". The reaction force motor 62 constitutes a reaction force actuator.

Though a detailed structure of the reaction force motor 62 is not illustrated, the reaction force motor 62 is a two-system, brushless DC motor, unlike the steering motor 24 that is the four-system, brushless DC motor. Accordingly, the operation device 18 may be assumed to have two electric motors. In this case, as shown in FIG. 1, portions of the reaction force motor 62 corresponding to the respective two systems will be hereinafter referred to as a reaction force motor 62a and a reaction force motor 62b for convenience sake. The operation reaction force functions as a force for returning the steering wheel 16 to a neutral position (at which the steering wheel 16 is operated neither rightward nor leftward). The operation reaction force is generated by supplying electric current to one of or both of the reaction force motors 62a, 62b. The operation reaction force has a magnitude generally proportional to a sum of the electric currents supplied to the reaction force motors 62a, 62b.

iv) Configuration of Controller

As shown in FIG. 1, the controller 20 configured to control the steering system includes five electronic control units (ECU) 70SAB, 70SC, 70SD, 70CA, 70CB. The ECUs 70SAB, 70SC, 70SD, 70CA, 70CB are respectively indicated in FIG. 1 as [ECU$_{SAB}$], [ECU$_{SC}$], [ECU$_{SD}$], [ECU$_{CA}$], [ECU$_{CB}$]. In the following explanation, a term "ECU 70" is used as a general term for each of the ECUs 70SAB, 70SC, 70SD, 70CA, 70CB when it is not necessary to distinguish the five ECUs from one another.

The ECUs 70SAB, 70SC, 70SD control the steering device 14. Specifically, according to the four systems of the steering motor 24, the ECU 70SAB controls the steering motor 24a and the steering motor 24b of the steering actuator 28, the ECU 70SC controls the steering motor 24c of the steering actuator 28, and the ECU 70SD controls the steering motor 24d of the steering actuator 28. The ECU 70SAB is constituted by a computer including a CPU, a ROM, a RAM, etc., and two inverters as drive circuits (drivers) of the respective two steering motors 24a, 24b. Each of the ECUs 70SC, 70SD is constituted by a computer including a CPU, a ROM, a RAM, etc., and an inverter as a drive circuit (driver) of a corresponding one of the steering motors 24c, 24d. While not illustrated, the inverters are connected to a power source and supply, to the corresponding steering motors 24a, 24b, 24c, 24d, a drive current based on a command of the computer. The steering motors 24a, 24b, 24c, 24d to which the drive current is supplied are operated by the drive current. In other words, the steering device 14 to which the drive current is supplied is operated by the drive current. In the following explanation, the ECUs 70SAB, 70SC, 70SD will be referred to as steering ECUs 70SAB, 70SC, 70SD, and a term "steering ECU 70S" is used as a general term of each of the steering ECUs 70SAB, 70SC, 70SD when it is not necessary to distinguish the steering ECUs 70SAB, 70SC, 70SD from one another. It is noted that the ECU 70SAB functions as a main steering ECU 70S and each of the ECUs 70SC, 70SD functions as a sub steering ECU 70S.

The ECUs 70CA, 70CB control the operation device 18. Specifically, according to the two systems of the reaction force motor 62, the ECU 70CA controls the reaction force motor 62a while the ECU 70CB controls the reaction force motor 62b, like the ECUs 70SA, 70SB. Each of the ECUs 70CA, 70CB is constituted by a computer including a CPU, a ROM, a RAM, etc., and an inverter as a drive circuit (driver) of a corresponding one of the reaction force motor 62a and the reaction force motor 62b. While not illustrated, the inverter of each ECU 70CA, 70CB is connected to a power source and supplies, to the corresponding one of the reaction force motor 62a and the reaction force motor 62b, a current based on a command of the computer. In the following explanation, the ECUs 70CA, 70CB will be referred to as reaction force ECUs 70CA, 70CB, and a term "reaction force ECU 70C" is used as a general term for each of the two reaction force ECUs 70CA, 70CB when it is not necessary to distinguish the two reaction force ECUs 70CA, 70CB from each other.

The steering motors 24a, 24b, 24c, 24d respectively include rotation angle sensors 72a, 72b, 72c, 72d (each of which is a resolver, an encoder or the like) and current sensors 74a, 74b, 74c, 74d for detecting electric current passing therethrough. Each rotation angle sensors 72a, 72b, 72c, 72d is configured to detect a relative phase between the magnets 56 attached to the motor shaft 48 and the corresponding coils 58a, 58b, 58c, 58d (which may be referred to as "electrical angle"), namely, the rotation angle of the motor shaft 48. The steering actuator 28 includes two steering amount sensors 76ab, 76cd each for detecting a steering amount. The steering amount may be considered as representing a steering angle of the wheels 12. The steering amount is an amount of the movement of the steering rod 26 in the right-left direction from its neutral position. Similarly, the reaction force motors 62a, 62b respectively include the rotation angle sensors 78a, 78b each for detecting the rotation angle of the motor shaft of the corresponding reaction force motor 62a, 62b and current sensors 80a, 80b for detecting electric current passing therethrough. The operation device 18 includes two operation amount sensors 82a, 82b (corresponding to the two systems) each for detecting an operation amount in the steering operation. The operation amount is a rotation angle of the steering wheel 16 from its neutral position. The vehicle 10 is further equipped with a vehicle speed sensor 84 for detecting a running speed of the vehicle 10 and a lateral acceleration sensor 86 for detecting lateral acceleration being generated in the vehicle 10. In FIG. 1, the rotation angle sensors 72a, 72b, 72c, 72d, the current sensors 74a, 74b, 74c, 74d, the steering amount sensors 76ab, 76cd, the rotation angle sensors 78a, 78b, the current sensors 80a, 80b, the operation amount sensors 82a, 82b, the vehicle speed sensor 84, and the lateral acceleration sensor 86 are respectively indicated as [$R_{SA}$], [$R_{SB}$], [$R_{SC}$], [$R_{SD}$], [$I_{SA}$], [$I_{SB}$], [$I_{SC}$], [$I_{SD}$], [$\theta_{AB}$], [$\theta_{CD}$], [$R_{CB}$], [$I_{CA}$], [$I_{CB}$], [$\delta_A$], [$\delta_B$], [v], [G].

The vehicle 10 is equipped with a car area network or controllable area network (CAN) 88. The ECUs 70SAB, 70SC, 70SD, 70CA, 70CB are connected to the CAN 88 so as to be communicable with one another. The rotation angle sensors 72a, 72b, 72c, 72d, the current sensors 74a, 74b, 74c, 74d, the steering amount sensors 76ab, 76cd, the rotation angle sensors 78a, 78b, the current sensors 80a, 80b, the operation amount sensors 82a, 82b, the vehicle speed sensor 84, and the lateral acceleration sensor 86 are also connected to the CAN 88. Each ECU 70 receives detection signals of the corresponding sensors via the CAN 88 and controls the electric current to be supplied to the corresponding steering motor 24a, 24b, 24c, 24d or the corresponding reaction force motor 62a, 62b, based on detection values indicated by the received detection signals.

[B] Processes Executed by Controller

The steering system executes: a main process for controlling the steering device 14 and the operation device 18; and an auxiliary process relating to the operations of the steering system. There will be hereinafter explained details of the main process, details of the auxiliary process, an operation mode of the controller 20 relating to execution of the processes.

i) Main Process

The main process includes a steering process executed by each of the steering ECUs 70SAB, 70SC, 70SD and a reaction force process executed by each of the reaction force ECUs 70CA, 70CB. The steering process is a control process in which each steering ECU 70SAB, 70SC, 70SD controls the steering device 14 to perform the steering of the wheels 12 in accordance with the operation of the steering wheel 16. The reaction force process is a control process in which each reaction force ECU 70CA, 70CB controls a corresponding one of the reaction force motors 62a, 62b to give, to the steering wheel 16, the operation reaction force in accordance with the operation amount. The steering process and the reaction force process will be explained hereinafter in detail.

For the steering of the wheels 12, there are provided three steering-related systems: a system including the steering ECU 70SAB, the steering motors 24a, 24b, the operation amount sensor 82a, and the steering amount sensor 76ab; a system including the steering ECU 70SC, the steering motor 24c, the operation amount sensor 82b, and the steering amount sensor 76cd; and a system including the steering ECU 70SD, the steering motor 24d, the operation amount sensor 82b, and the steering amount sensor 76cd. In other words, there are provided a main steering-related system in which the steering ECU 70SAB is responsible for the control of the steering system and a sub steering-related system in which the steering ECUs 70SC, 70SD are responsible for the control of the steering system.

As later explained in detail, two operation modes, i.e., a first mode and a second mode, are prepared as the operation mode of the controller 20 in the normal condition. In the first mode, the three steering-related systems concurrently perform the steering of the wheels 12 such that the steering motors 24a, 24b, 24c, 24d equally generate a torque. In the second mode, the main steering-related system and one of the two sub steering-related systems concurrently perform the steering of the wheels 12 such that the steering motors 24a, 24b, 24c or the steering motors 24a, 24b, 24d equally generate a torque.

For the application of the operation reaction force, there are provided two reaction-force-related systems: a system including the reaction force ECU 70CA, the reaction force motor 62a, and the operation amount sensor 82a; and a system including the reaction force ECU 70CB, the reaction force motor 62b, and the operation amount sensor 82b. In the normal condition, the two reaction-force-related systems concurrently perform the application of the operation reaction force such that the reaction force motors 62a, 62b equally generate a torque.

In the case where one of the three steering-related systems fails to operate or in the case where one of the two reaction-force-related systems fails to operate, the other two of the three steering-related systems that are not in failure can perform the steering of the wheels 12 or the other of the two reaction-force-related systems that is not in failure can perform the application of the operation reaction force. Since control necessary for the steering-related systems or the reaction-force-related systems executed in a non-failure condition and control in the failure condition are well known, a detailed explanation thereof is dispensed with.

In the following explanation of each of the steering process and the reaction force process, there will be explained control executed by one of the three steering-related systems and control executed by one of the two reaction-force-related systems, each as a representative example. In the explanation, the respective constituent components in the steering-related systems and in reaction-force-related systems are referred generally to as the steering ECU 70S, the steering motor 24, the rotation angle sensor 72, the current sensor 74, the operation amount sensor 82, the steering amount sensor 76, the reaction force ECU 70C, the reaction force motor 62, the rotation angle sensor 78, and the current sensor 80.

i-a) Steering Process

In the steering process, the steering ECU 70, specifically, the computer of the ECU 70S, obtains an operation amount δ of the steering wheel 16 based on detection by the operation amount sensor 82 and determines a target steering amount θ* as a steering amount θ to be achieved, based on the operation amount δ according to a set steering gear ratio (i.e., θ/δ) that is a design value set in the present steering system. The steering ECU 70S obtains an actual steering amount θ at the current time point based on detection by the steering amount sensor 76 and obtains a steering amount deviation Δθ that is a deviation of the actual steering amount θ from the target steering amount θ*. The steering ECU 70S determines, based on the steering amount deviation Δθ, a target supply current $I_S^*$ that is electric current to be supplied to the steering motor 24. In other words, the target supply current $I_S^*$ is determined by the following equation according to a PID control rule:

$$I_S^* = \alpha \cdot \Delta\theta + \beta \cdot d\Delta\theta + \gamma \cdot \int \Delta\theta$$

dΔθ: derivative value of the steering amount deviation Δθ
∫Δθ: integral value of the steering amount deviation Δθ
α: proportional term gain
β: derivative term gain
γ: integral term gain To supply the determined target supply current $I_S^*$ to the steering motor 24, the inverter as the drive circuit of the steering ECU 70S operates based on a rotation angle $R_S$ of the steering motor 24 detected by the rotation angle sensor 72 and electric current $I_S$ that is actually flowing in the steering motor 24 and detected by the current sensor 74.

In the steering process, the steering of the wheels 12 is performed while detecting the actual steering amount θ0. Thus, the steering is good in response and accuracy. While not explained in detail, the proportional term gain α, the derivative term gain β, and the integral term gain γ in the above equation for determining the target supply current $I_S^*$ may be varied in accordance with a running speed v of the vehicle detected by the vehicle speed sensor 84, lateral acceleration G based on detection by the lateral acceleration sensor 86, and so on, whereby the steering device 14 performs appropriate steering of the wheels 12 in accordance with the vehicle running state or the like. To phrase it simply, the steering device 14 performs steering with special characteristics and performance desired by the driver.

In the steering process, the steering ECU 70S executes a steering process based on detections by the plurality of sensors. Specifically, the steering of the wheels 12 is controlled utilizing detection values of the two sensors relating to the steering amount θ, i.e., the steering amount sensor 76 and the rotation angle sensor 72. Specifically, a control loop (minor loop) of the rotation angle $R_S$ of the steering motor 24 based on detection by the rotation angle sensor 72 exists in a control loop (outer loop) of the steering amount θ based on detection by the steering amount sensor 76. Further, the procedure for determining the target supply current $I_S^*$ is complicated. Therefore, the processing amount of the steering ECU 70S in the steering process is considerably large. Here, an execution cycle time is defined as a time taken by the steering ECU 70S for one execution of one process that is repeatedly executed. The execution cycle time of the steering process needs to be made longer to a certain degree.

i-c) Reaction Force Process

The reaction force process is executed by the reaction force ECU 70C. In the reaction force process, the reaction force ECU 70C obtains the operation amount δ of the steering wheel 16 based on detection by the operation amount sensor 82. On the basis of the obtained operation amount δ, the reaction force ECU 70C determines a target supply current $I_C^*$ that is electric current $I_C$ to be supplied to the reaction force motor 62, so as to apply, to the steering wheel 16, a torque in a direction to return the steering wheel 16 to the neutral position. Further, the inverter as the drive circuit of the reaction force ECU 70C operates based on the rotation angle $R_C$ of the reaction force motor 62 detected by the rotation angle sensor 78 and the electric current $I_C$ that is actually flowing in the reaction force motor 62 and detected by the current sensor 80. In this respect, the torque generated by the reaction force motor 62 is set so as to generally correspond to the electric current $I_C$ that is being supplied to the reaction force motor 62 and so as to be generally proportional to the operation amount δ, namely, the rotation angle of the steering wheel 16 from the neutral position.

The load of the reaction force ECU 70C in the reaction force process is comparatively small, and the execution cycle time of the reaction force process is shorter than that of the steering process.

ii) Auxiliary Process

The present steering system executes, as the auxiliary process relating to the operation of the steering system, two processes, i.e., a system appropriateness determining process of determining whether or not the steering system is in a state in which the steering of the wheels 12 is appropriately performed and a breakdown-tendency recognition process of recognizing that the steering system has a tendency to break down. The system appropriateness determining process and the breakdown-tendency recognition process relate mainly to normality of the steering device 14 and are executed by any one of the steering ECUs 70S as the electronic control unit for controlling the steering device 14. Specifically, the system appropriateness determining process and the breakdown-tendency recognition process are executed by one of the steering ECUs 70SC, 70SD each as the sub steering ECU 70S.

ii-a) System Appropriateness Determining Process

It is determined in the system appropriateness determining process whether or not appropriate steering of the wheels 12 is being performed by comparing: the steering of the wheels 12 based on the operation amount δ that is obtained based on the result of detection by the operation amount sensor 82; and the steering of the wheels 12 based on the obtained operation amount δ and the steering amount θ obtained based on the result of detection by the steering amount sensor 76. Specifically, if based on the obtained operation amount δ, a theoretical steering amount $θ_{TH}$, which is a theoretical value of the steering amount θ, is obtained according to the set steering gear ratio. When a difference between the theoretical steering amount $θ_{TH}$ and an actual steering amount θ detected by the steering amount sensor 76 is not smaller than a threshold difference, it is determined that the steering system is not in the state in which the steering of the wheels 12 is appropriately performed. It is noted that the determination by the system appropriateness determining process is made for the main steering-related system and one of the two sub steering-related systems that is not executing the system appropriateness determining process.

It is determined in the system appropriateness determining process that the steering system is not in the state in which the steering of the wheels 12 is appropriately performed also when the detection results of the steering amount sensors 76ab, 76cd that respectively correspond to the main steering-related system and the sub steering-related systems differ from each other to not lower than a certain extent and also when the detection results of the operation amount sensors 82a, 82b that respectively correspond to the two reaction-force-related systems differ from each other to not lower than a certain extent.

ii-b) Breakdown-Tendency Recognition Process

In the breakdown-tendency recognition process, it is detected whether or not a force that leads to the breakdown of the steering system is acting on the system. Especially, a force that acts on the steering device 14 is detected. In the case where the force, namely, the excessive input, is applied, cumulative application of the excessive input is stored in view of the possibility of occurrence of the breakdown of the steering device 14 by being damaged due to fatigue, for instance. Specifically, the number of times of applications of the excessive input is counted and stored as history. In the case where the cumulative application of the excessive input estimated as described below exceeds a set degree, in other words, in the case where the counted value of the number of times of applications of the excessive input exceeds a set value, it is determined that the steering system has a tendency to break down.

The excessive input to the steering device 14 is estimated based on a relationship between: a change in the steering amount θ obtained based on the result of detection by the steering amount sensor 76; and a change in the electric current $I_S$ that flows in the steering motor 24 and that is obtained based on the result of detection by the current sensor 74. For instance, in the case where excessive electric current $I_S$ flows through the steering motor 24 due to counter electromotive force, it is estimated that a large load acts on the steering device 14 due to relatively severe contact of the wheel 12 with a curb or the like. Further, in the case where large electric current $I_S$ is supplied to the steering motor 24 for a long time period when the wheels 12 are positioned at an end of a steering range of the steering device 14, namely, in a steering end state of the wheels 12, it is estimated that a large load acts on the steering device 14.

As described above, the manner of the estimation of the excessive input is complicated, and the estimation requires a difficult and time-consuming procedure such as differential operation processing. Though detailed explanation of the breakdown-tendency recognition process is omitted here, it involves such a complicated and difficult procedure, thus imposing, on the steering ECU 70S, a relatively large load by execution of the breakdown-tendency recognition process, namely, by execution of the auxiliary process including the breakdown-tendency recognition process. In other words, the execution cycle time of the breakdown-tendency recognition process has to be inevitably long.

iii) Processing Load and Operation Mode of Controller

When the controller 20 parallelly executes the main process and the auxiliary process, the controller 20 suffers from a large load because the respective execution cycle times of the main process and the auxiliary process are long. Specifically, when one of the two sub steering ECUs 70SC, 70SD of the controller 20 parallelly executes, in a time division manner, the steering process as the main process and the auxiliary process including the system appropriateness determining process and the breakdown-tendency recognition process, the one of the two sub steering ECUs 70SC, 70SD suffers from a large load. Here, in the case where a processing amount of all processes executed by the controller 20 per unit time is defined as an overall processing amount, the execution ratio is defined as a ratio of a processing amount of each process to be executed with respect to the overall processing amount. According to the definition, the execution ratio of the main process and the execution ratio of the auxiliary process can be defined. Each of the two sub steering ECUs 70SC, 70SD of the controller 20 executes a selected one of the steering process as the main process and the auxiliary process, whereby the execution ratio of the main process and the execution ratio of the auxiliary process are changed. Thus, the load of the controller 20 is prevented from becoming excessive. Further, the load imposed on the two sub steering ECUs 70SC, 70SD by execution of the processes is made small, thus enabling use of simple and inexpensive sub steering ECUs 70SC, 70SD and the controller 20.

In the present steering system, two operation modes, i.e., a first mode and a second mode, are prepared as the operation mode of the controller 20. The controller 20 operates in a selected one of the two operation modes. Specifically, irrespective of whether the controller 20 operates in the first mode or the second mode, the reaction force process as the main process is executed in the reaction force ECUs 70CA, 70CB, and the steering process as the main process is executed in the main steering ECU 70SAB. When the controller 20 operates in the first mode, the steering process as the main process is executed in both of the sub steering ECUs 70SC, 70SD. When the controller 20 operates in the second mode, the steering process as the main process is executed in one of the sub steering ECUs 70SC, 70SD and the auxiliary process is executed in the other of the sub steering ECUs 70SC, 70SD. That is, each of the sub steering ECUs 70SC, 70SD is a both process execution unit having a function of executing a selected one of the main process and the auxiliary process. That is, the sub steering ECUs 70SC, 70SD alternately exert the function of executing a selected one of the main process and the auxiliary process. Accordingly, in a certain time period, only one of the sub steering ECUs 70SC, 70SD executes a selected one of the main process and the auxiliary process.

The processes executed in each of the two operation modes are diagrammatically illustrated in FIGS. 3A and 3B.

That is, the first mode is illustrated in a chart of FIG. 3A, and the second mode is illustrated in a chart of FIG. 3B. In the case where the controller 20 executes collectively all of the processes that should be executed, a time pitch of repetition of a set of the processes is referred to as an execution pitch tp, as illustrated in the charts. In the present controller 20, the execution pitch tp is the same between the two operation modes. The processes that should be executed are repeated at every execution pitch tp. Here, a time taken by execution of each process in the execution pitch tp is referred to as an execution cycle time tc. As illustrated in the charts, the execution cycle times tc of the steering process, the system appropriateness determining process, the breakdown-tendency recognition process, and the reaction force process are respectively represented as $tc_S$, $tc_{D1}$, $tc_{D2}$, $tc_C$. In the chart of FIG. 3A, the execution cycle time $tc_S$ of the steering process is treated as being equal to the execution pitch tp for easy understanding. Similarly, in the chart of FIG. 3B, a sum of the execution cycle time $tc_{D1}$ of the system appropriateness determining process and the execution cycle time $tc_{D2}$ of the breakdown-tendency recognition process, each as the auxiliary process, is treated as being equal to the execution pitch tp. As explained above and later, the auxiliary process is executed every certain time period alternately by the sub steering ECU 70SC and the sub steering ECU 70SD. The chart of FIG. 3B shows a state in which the auxiliary process is executed in the sub steering ECU 70SC.

When focusing on each ECU 70, the execution ratio c of each process is regarded as the execution cycle time tc of each process with respect to the execution pitch tp. Specifically, the execution ratio $\varepsilon_S$ of the steering process, the execution ratio $\varepsilon_{D1}$ of the system appropriateness determining process, the execution ratio $\varepsilon_{D2}$ of the breakdown-tendency recognition process, and the execution ratio $\varepsilon_C$ of the reaction force process are respectively regarded as $tc_S/tp$, $tc_{D1}/tp$, $tc_{D2}/tp$, $tc_C/tp$. Accordingly, the execution ratio $\varepsilon_M$ of the main process and the execution ratio $\varepsilon_A$ of the auxiliary process in the first mode in the sub steering ECU 70SC are respectively represented in terms of percentage as follows:

$$\varepsilon_M = \varepsilon_S = 100\%, \varepsilon_A = \varepsilon_{D1} + \varepsilon_{D2} = 0\%$$

Further, the execution ratio $\varepsilon_M$ of the main process and the execution ratio $\varepsilon_A$ of the auxiliary process in the second mode in the sub steering ECU 70SC are respectively represented in terms of percentage as follows:

$$\varepsilon_M = \varepsilon_S = 0\%, \varepsilon_A = \varepsilon_{D1} + \varepsilon_{D2} = 100\%$$

When focusing on the controller 20 as a whole, the execution ratio $\varepsilon_M$ of the main process and the execution ratio $\varepsilon_A$ of the auxiliary process in the first mode are respectively represented in terms of percentage as follows in the case where the execution ratio $\varepsilon_C$ of the reaction force process in one reaction force ECU 70C is 30%:

$$\varepsilon_M = (100 \times 3 + 30 \times 2)/500 = 72\%, \varepsilon_A = 0\%$$

Further, the execution ratio $\varepsilon_M$ of the main process and the execution ratio $\varepsilon_A$ of the auxiliary process in the second mode are respectively represented in terms of percentage as follows in the case where the execution ratio $\varepsilon_C$ of the reaction force process in one reaction force ECU 70C is 30%:

$$\varepsilon_M = (100 \times 2 + 30 \times 2)/500 = 52\%$$

$$\varepsilon_A = 100/500 = 20\%$$

That is, both of when focusing on the controller 20 as a whole and when focusing on the sub steering ECU 70SC as the both process execution unit, the execution ratio $\varepsilon_M$ of the main process is lower and the execution ratio $\varepsilon_A$ of the auxiliary process is higher in the second mode than those in the first mode. Conversely, the execution ratio $\varepsilon_M$ of the main process is higher and the execution ratio $\varepsilon_A$ of the auxiliary process is lower in the first mode than those in the second mode.

As is understood from the explanation above, by switching the operation mode of the controller 20 from the first mode to the second mode, the execution ratio $\varepsilon_M$ of the main process is decreased while the execution ratio $\varepsilon_A$ of the auxiliary process is increased. By switching the operation mode of the controller 20 from the second mode to the first mode, the execution ratio $\varepsilon_M$ of the main process is increased while the execution ratio $\varepsilon C_A$ of the auxiliary process is decreased.

iv) Switching of Operation Mode

Changing of the execution ratio $\varepsilon_M$ of the main process and the execution ratio $\varepsilon E_A$ of the auxiliary process, namely, switching of the operation mode between the first mode and the second mode, is executed based on the running state of the vehicle 10 and the operating state of the steering system. More specifically, in the present steering system, the operation mode is set to the first mode in the normal condition, and the operation mode is set to the second mode when a first condition that a running speed v of the vehicle 10 is not lower than a threshold speed $v_0$ and a second condition that electric current (drive current) $I_S$ supplied to the steering motor 24 is not larger than a threshold current $I_{TH}$ are satisfied.

When the vehicle 10 is running at a relatively high speed, the steering of the wheels 12 can be performed with a relatively small force. In this case, the steering of the wheels 12 can be sufficiently performed even if not all of the four systems of the steering motor 24 generate a torque. The first condition is set in view of this. When the drive current $I_S$ being supplied to the steering motor 24 is relatively small, the steering device 14 is not actually exerting a large force. Accordingly, not all of the four systems of the steering motor 24 need generate a torque. The second condition is set in view of this. In the present steering system, the operation mode is set to the second mode when both of the first condition and the second condition are satisfied for ensuring smooth steering of the wheels 12 with higher reliability. However, the operation mode may be set to the second mode when only the first condition is satisfied, for instance.

The running speed v of the vehicle 10 used for determining whether or not the first condition is satisfied may be obtained based on detection by the vehicle speed sensor 84 installed on the vehicle 10. The drive current $I_S$ supplied to the steering motor 24 and used for determining whether or not the second condition is satisfied may be obtained by summing up electric currents based on detections by the current sensors 74a, 74b, 74c, 74d that are provided so as to correspond to the four systems of the steering motor 24. In this respect, in the case where the controller 20 is operating in the second mode, the drive current is not being supplied to one of the steering motors 24c, 24d. Accordingly, the drive current $I_S$ is actually obtained by summing up electric currents based on detections by the three current sensors 74a, 74b, 74c or the three current sensors 74a, 74b, 74d.

As explained above, the sub steering ECU 70SC and the sub steering ECU 70SD, each as the both process execution unit, perform the auxiliary process alternately every set time period. The system appropriateness determining process is executed for one of the two sub steering-related systems that is not executing the system appropriateness determining process. Thus, the execution of the auxiliary process alternately by the sub steering ECU 70SC and the sub steering ECU 70SD is consideration to determine normality of the steering of the wheels 12 for the entirety of the steering system.

v) Flow of Switching of Operation Mode

Figure 4:
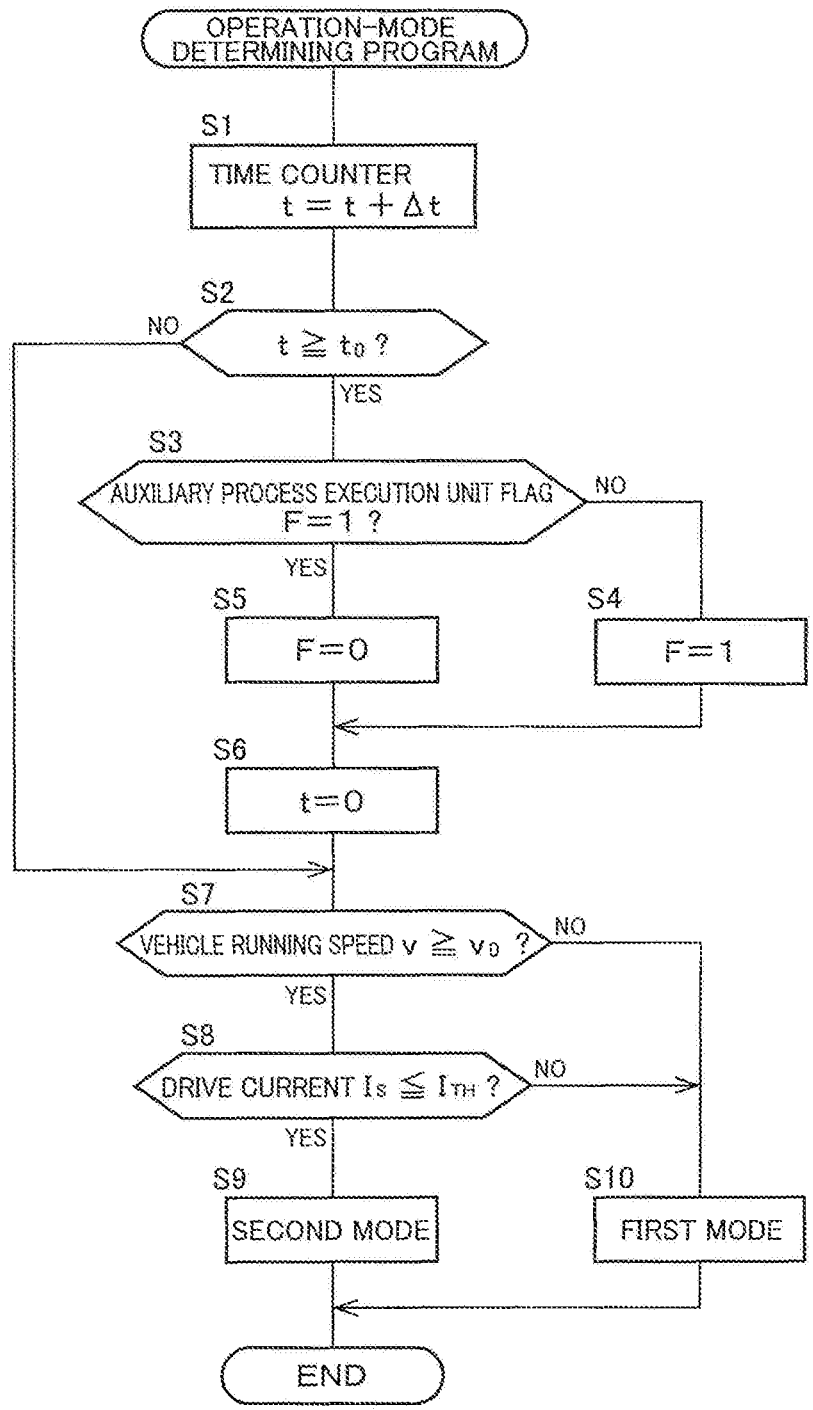
FIG. 4 is a flowchart indicating a program executed for determining the operation mode.

Switching of the operation mode of the controller 20 between the first mode and the second mode is executed such that the controller 20 executes an operation-mode determining program indicated by a flowchart of FIG. 4. The operation-mode determining program is a process that involves a short execution cycle time. Accordingly, as illustrated in the charts of FIGS. 3A and 3B, the program is executed in the execution pitch tp by the reaction force ECU 70C (one of the reaction force ECU 70CA and the reaction force ECU 70CB) that can afford a processing capacity. The execution pitch tp is set to about 0.5 msec-10 msec, for instance. Referring to the flowchart, there will be hereinafter briefly explained a process according to the operation-mode determining program.

In the process according to the operation-mode determining program, Step 1 is initially implemented to increment, by a count-up time Δt, a time counter value t for switching the sub steering ECU 70S to execute the auxiliary process in the second mode between the sub steering ECU 70SC and the sub steering ECU 70SD. (Step 1 is abbreviated as "S1". Other steps will be similarly abbreviated.) At S2, it is determined whether or not the time counter value t becomes equal to a set value $t_0$. Determination as to which one of the sub steering ECUs 70SC, 70SD executes the auxiliary process is made based on a flag value of an auxiliary process execution unit flag F. In the case where the flag value of the flag F is "0", the sub steering ECU 70SC executes the auxiliary process in the second mode. In the case where the flag value is "1", the steering ECU 70SD executes the auxiliary process in the second mode. When it is determined at S2 that the time counter value t becomes equal to $t_0$, S3 is implemented to determine whether the flag value F at the current time point is "0" or "1". In the case where the flag value F at the current time point is "0", S4 is implemented to set the flag value F to "1". On the other hand, in the case where the flag value F at the current time point is "1", S5 is implemented to set the flag value F to "0", and the time counter value t is reset at S6.

Irrespective of whether the flag value of the auxiliary process execution unit flag F is changed or not, it is determined at S7 whether or not the running speed v of the vehicle 10 obtained based on detection by the vehicle speed sensor 84 is not lower than the threshold speed $v_0$. When the running speed v is not lower than the threshold speed $v_0$, S8 is implemented to determine whether the drive current $I_S$ being supplied to the steering motor 24 is not larger than the threshold current $I_{TH}$. When the drive current $I_S$ is not larger than the threshold current $I_{TH}$, the operation mode of the controller 20 is set to the second mode at S9. On the other hand, when it is determined at S7 that the running speed v of the vehicle 10 is lower than the threshold speed $v_0$ or when it is determined at S8 that the drive current $I_S$ is in excess of the threshold current $I_{TH}$, the operation mode of the controller 20 is set to the first mode at S10.

As explained above, the operation modes are changed depending on circumstances, namely, the respective execution ratios of the main process and the auxiliary process executed by the controller 20 are changed, thus making it possible to prevent the processing load of the controller 20 from becoming excessive. Specifically, the steering of the wheels 12 can be performed with a sufficient force by increasing the execution ratio of the main process and the auxiliary process can be sufficiently executed by increasing the execution ratio of the auxiliary process while preventing an increase in the load of the controller 20.

What is claimed is:

1. A steering system of a vehicle, comprising an operation member to be operated by a driver, a steering device configured to steer a wheel, and a controller configured to control the steering system,
    wherein the controller is configured to parallelly execute a main process including a process in which the controller controls the steering device to perform steering of the wheel in accordance with an operation of the operation member and an auxiliary process relating to an operation of the steering system and configured to decrease an execution ratio of the main process and increase an execution ratio of the auxiliary process when a condition that a running speed of the vehicle is not lower than a threshold speed is satisfied, the execution ratio is defined as a ratio of a processing amount of each process to be executed with respect to an overall processing amount,
    wherein the auxiliary process includes a breakdown-tendency recognition process of recognizing that the steering system has a tendency to break down.

2. The steering system according to claim 1, wherein the parallelly executed auxiliary process by the controller, the controller including and executing a system appropriateness determining process for determining whether or not the steering system is in a state in which the steering of the wheel is appropriately performed.

3. The steering system according to claim 1,
    wherein the steering device is configured to be operated by a drive current supplied thereto, and
    wherein the controller is configured to decrease the execution ratio of the main process and increase the execution ratio of the auxiliary process when both of the condition that the running speed of the vehicle is not lower than the threshold speed and a condition that the drive current is not larger than a threshold current are satisfied.

4. The steering system according to claim 1,
    wherein the controller is configured to be operable in a first mode and operable in a second mode in which the execution ratio of the main process is set to be lower than that in the first mode and the execution ratio of the auxiliary process is set to be higher than that in the first mode, and
    wherein the controller is configured to switch an operation mode thereof from the first mode to the second mode so as to decrease the execution ratio of the main process and increase the execution process of the auxiliary process.

5. The steering system according to claim 1,
    wherein the steering device includes a plurality of drive sources, and the controller includes a plurality of electronic control units each of which is configured to control at least one of the plurality of drive sources, and
    wherein the steering device is configured to steer the wheel by a drive force of at least one of the plurality of drive sources controlled by any of the plurality of electronic control units.

6. The steering system according to claim 5, wherein at least one of the plurality of electronic control units is a both process execution unit configured to selectively execute one of the main process and the auxiliary process, and the both process execution unit is configured to execute the auxiliary process in place of the main process, so that the controller decreases the execution ratio of the main process and increases the execution ratio of the auxiliary process.

7. The steering system according to claim 6,
wherein the controller includes, as the both process execution unit, at least two both process execution units, and
wherein the at least two both process execution units alternately execute the auxiliary process in place of the main process.

8. A steering system of a vehicle, comprising an operation member to be operated by a driver, a steering device configured to steer a wheel, and a controller configured to control the steering system,
wherein the controller is configured to parallelly execute a main process including a process in which the controller controls the steering device to perform steering of the wheel in accordance with an operation of the operation member and an auxiliary process relating to an operation of the steering system and configured to decrease an execution ratio of the main process and increase an execution ratio of the auxiliary process when a condition that a running speed of the vehicle is not lower than a threshold speed is satisfied, the execution ratio is defined as a ratio of a processing amount of each process to be executed with respect to an overall processing amount,
wherein the auxiliary process includes a system appropriateness determining process for determining whether or not the steering system is in a state in which the steering of the wheel is appropriately performed by comparing a steering of the wheel based on an operation amount detected by a first sensor and the steering of the wheel based on an actual steering amount based by a second sensor, the second sensor different from the first sensor.

9. The steering system according to claim 8,
wherein the steering device is configured to be operated by a drive current supplied thereto, and
wherein the controller is configured to decrease the execution ratio of the main process and increase the execution ratio of the auxiliary process when both of the condition that the running speed of the vehicle is not lower than the threshold speed and a condition that the drive current is not larger than a threshold current are satisfied.

10. The steering system according to claim 8,
wherein the controller is configured to be operable in a first mode and operable in a second mode in which the execution ratio of the main process is set to be lower than that in the first mode and the execution ratio of the auxiliary process is set to be higher than that in the first mode, and
wherein the controller is configured to switch an operation mode thereof from the first mode to the second mode so as to decrease the execution ratio of the main process and increase the execution process of the auxiliary process.

11. The steering system according to claim 8,
wherein the steering device includes a plurality of drive sources, and the controller includes a plurality of electronic control units each of which is configured to control at least one of the plurality of drive sources, and
wherein the steering device is configured to steer the wheel by a drive force of at least one of the plurality of drive sources controlled by any of the plurality of electronic control units.

12. The steering system according to claim 11, wherein at least one of the plurality of electronic control units is a both process execution unit configured to selectively execute one of the main process and the auxiliary process, and the both process execution unit is configured to execute the auxiliary process in place of the main process, so that the controller decreases the execution ratio of the main process and increases the execution ratio of the auxiliary process.

13. The steering system according to claim 12,
wherein the controller includes, as the both process execution unit, at least two both process execution units, and
wherein the at least two both process execution units alternately execute the auxiliary process in place of the main process.

* * * * *